Figure 1:
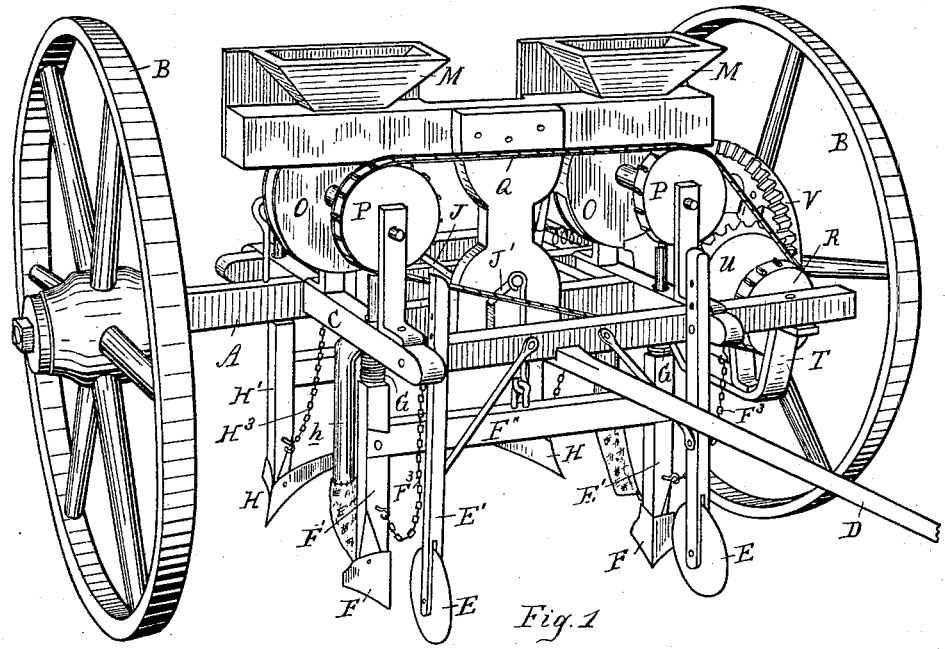

(No Model.) 2 Sheets—Sheet 1.

A. N. WOODARD.
CORN AND BEAN PLANTER.

No. 390,425. Patented Oct. 2, 1888.

Attest:
John Schuman.
P. M. Hulbert

Inventor:
Alvin N. Woodard.
By
Thos. S. Sprague & Son
Att'y (No Model.) 2 Sheets—Sheet 2.
A. N. WOODARD.
CORN AND BEAN PLANTER.
No. 390,425. Patented Oct. 2, 1888.
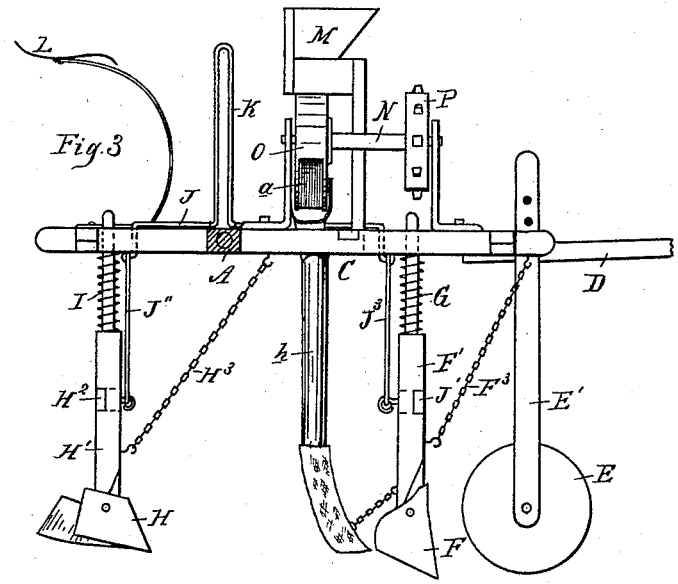
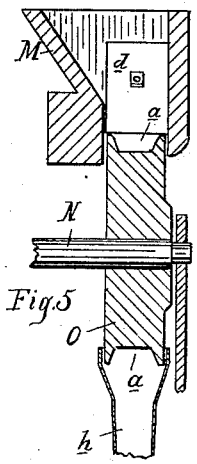
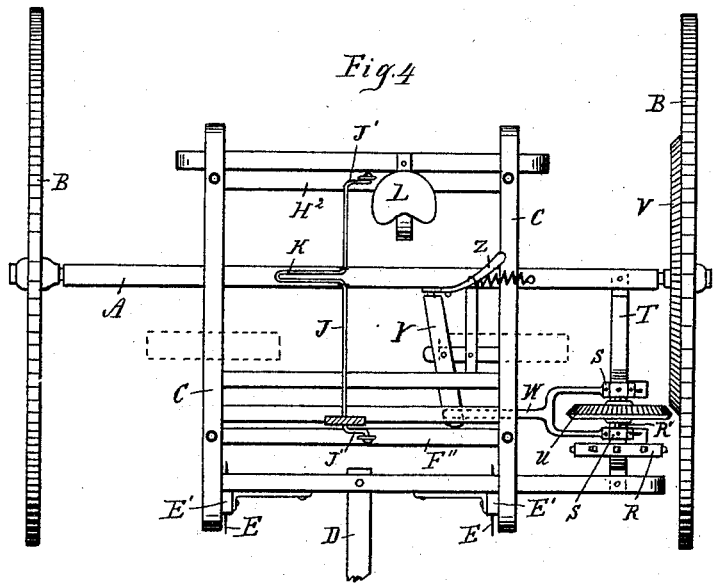
Attest:
John Schuman.
P. M. Hulbert
Inventor:
Alvin N. Woodard.
By Thos. S. Sprague & Son
Atty

UNITED STATES PATENT OFFICE.

ALVIN N. WOODARD, OF JAMESTOWN, NEW YORK.

CORN AND BEAN PLANTER.

SPECIFICATION forming part of Letters Patent No. 390,425, dated October 2, 1888.

Application filed February 23, 1888. Serial No. 265,002. (No model.)

*To all whom it may concern:*

Be it known that I, ALVIN N. WOODARD, a citizen of the United States, residing at Jamestown, in the county of Chautauqua and State of New York, have invented certain new and useful Improvements in Corn and Bean Planters, of which the following is a specification, reference being had therein to the accompanying drawings.

This invention relates to new and useful improvements in planters especially designed for planting corn, peas, beans, and potatoes; and the invention consists in the improved construction and operation of the parts, all as more fully hereinafter described, and shown in the drawings, of which—

Figure 2:
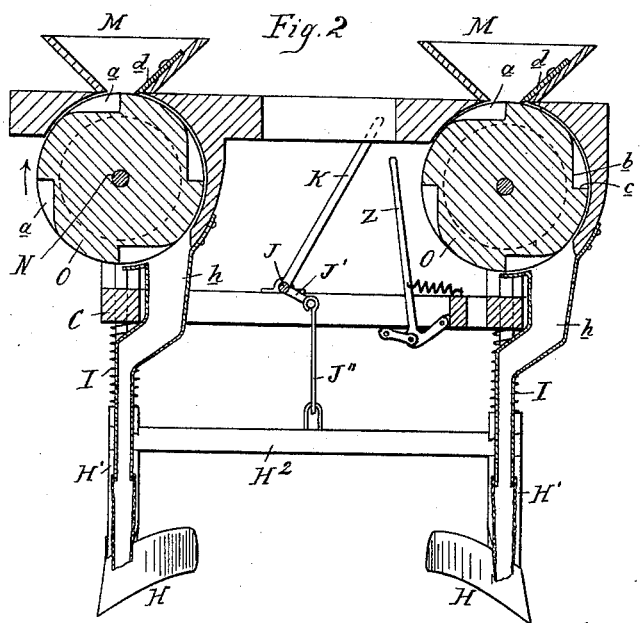

Figure 1 is a perspective view. Fig. 2 is a transverse section through the hopper and dropper. Fig. 3 is a side elevation. Fig. 4 is a plan of the supporting-frame. Fig. 5 is a cross-section through the hopper and dropper as arranged for corn or other seed.

A is the axle-tree, at the outer ends of which are journaled the ground-wheels B, upon which the device is supported.

C is the main frame, secured to the axle-tree and provided with suitable pole or other draft attachment, D.

E are rolling cutters secured, one on each side of the frame, to the vertical standards E', which are adjustably and detachably secured in any suitable manner to the frame. In the rear of the cutters are the furrowing-shares F, secured to the lower ends of the standards F', one on each side of the frame. The upper ends of these standards engage slidingly in suitable bearings in the main frame and have sleeved upon them below such bearings the coil-springs G. The two standards F' are connected by a cross-bar, F'', and a chain, F³, connects each standard with the frame to gage the depth of furrow dug by the share and to resist the rearward thrust.

H are a pair of covering-shares arranged in line with the furrowing-shares and secured to the standards H', the upper ends of which slidingly engage in suitable bearings on the frame, which are also provided with coil-springs I, sleeved upon the standards below the bearings. The two standards H' are connected by the cross-bar H'', and each standard is connected to the frame by the chain H³, to gage the depth to which the covering share enters the ground and to counteract the rearward thrust.

J is a shaft journaled longitudinally upon the frame and provided with the hand-lever K and the cranks J'. The rear crank is connected by a link, J'', with the cross-bar of the frame of the covering-shares, and the front crank is connected by a similar link, J³, with the frame of the furrowing-shares, all so arranged that by means of the lever K, which is arranged in proximity to the seat L, the driver may raise and lower the furrowing and covering shares simultaneously from or to the ground, while at the same time, by means of the construction described, the furrowing-shares and the covering shares are carried by independent frames to gage the depth of their operation, and are furthermore perfectly free to rise and fall of their own accord to pass over stones or other obstacles.

Above the frame, on the forward part thereof, are supported the hoppers M, below the discharge-openings of which are secured upon the shafts N the rotary droppers O. The shafts N are journaled longitudinally of the frame in suitable bearings, and have secured near their front ends the sprocket-wheels P. Motion is conveyed to these sprocket-wheels by means of the endless belt or chain Q, which passes over the sprocket-wheel R, which is journaled in the bearings S, which are slidingly secured upon a suitable cross-girt, T, of the frame. Upon the same shaft, R', with the sprocket R is secured the bevel gear-wheel U, which engages with the drive-gear V upon one of the ground-wheels. The sliding bearings S are secured to the end of the connecting-rod W, the inner end of which is pivotally secured to one end of the lever Y, the opposite end of which is engaged by the hand-lever Z, which is suitably fulcrumed to the frame in proximity to the seat L of the driver, all so arranged that by means of the hand-lever Z the bevel-wheel U is thrown in and out of gear with the drive-gear upon the ground-wheel, thereby communicating motion to the droppers at the will of the operator. The droppers are provided with the peripheral cavities $a$, which in cross-section are formed of the bottom $b$ and the sides $c$, as shown in Fig. 2.

$d$ is a scraper or knife secured within the hopper upon the side over which the dropper rotates, all so arranged that the scraper or knife in the rotation of the dropper will act as a cut-off to prevent any more grain being carried off than the full of the cavity, and also prevent choking or wedging, as the bottom of the cavity or pocket gradually merges into the periphery of the dropper. I secure these droppers removably upon their shafts in any suitable manner, for the purpose of exchanging them with droppers of other construction.

Each dropper is provided with the usual spout, h, to conduct the grain or seed into the furrows opened by the furrowing-shares in the usual manner.

Although the furrowing-shares and the covering-shares are respectively carried by vertical frames connected to both shares of each kind, they are still adapted to independently rise and fall in passing over obstructions by providing a limited play in the bearing of the standards, which admits both of a limited lateral and vertical play of the frames. A sufficient play may be provided in the connection of the frames with the crank-shaft J to render the frames independently adjustable of each other without, however, interfering with the operation of the lever K.

My device may be used to good advantage in planting into sodded ground, and in cultivated ground the rolling cutters E may be omitted.

The advantage of revolving each dropper on its own shaft, which is placed longitudinally of the frame and driven in the manner described, is that great facility is obtained to adjust the droppers in different relations to each other merely by changing their relative engagement with the drive-chain.

What I claim as my invention is—

1. The combination, with the main frame of the planter, of the two vertical independent frames slidingly secured in vertical bearings on the main frame transversely thereof, and carrying, respectively, the furrowing-shares and the covering-shares, the coil-springs sleeved upon the upper ends of the vertical standards of the frames, and the hand-lever, with its double crank-shaft and connection with such frames for jointly raising and lowering the same, substantially as described.

2. The combination, with the main frame of the planter, of two vertical independent frames carrying the furrowing and covering devices, respectively, and consisting each of two vertical standards to which the furrowing and covering shares are respectively secured, and of a cross-bar connecting such standards, the vertical bearings in which the upper ends of such standards slidingly engage, and wherein they have a limited play, the coil-springs sleeved upon the upper ends of the standards, the chain securing each standard to the main frame, the crank-shaft journaled longitudinally on the main frame, the crank and connecting-links with the cross-bar of each frame, and a hand-lever near the driver's seat to operate such crank-shaft, substantially as described.

3. The combination, in a planter, of rotary droppers journaled on independent shafts longitudinally of the main frame of the planter, the sprocket-wheels on said shaft, the sprocket-wheel in the drive connection with the ground-wheel, and the sprocket-chain passing around said sprocket-wheels and the sprocket-wheels on the dropper-shafts, substantially as described.

4. The combination, with the main frame and the hoppers M, of the rotary droppers O, the shafts N, journaled longitudinally of the main frame, the sprocket-wheel P, the shaft R′, journaled in laterally-sliding bearings, the gear-wheels U, and sprocket-wheel R, secured upon said shaft R′, the sprocket-chain Q, the drive-gear V, secured to the ground-wheel, and the hand-lever Z and its connection with the sliding shaft R′, substantially as described.

In testimony whereof I affix my signature, in presence of two witnesses, this 2d day of January, 1888.

ALVIN N. WOODARD.

Witnesses:
JAS. WHITTEMORE,
P. M. HULBERT.